United States Patent [19]
Corvi et al.

[11] Patent Number: 5,907,641
[45] Date of Patent: May 25, 1999

[54] DIGITAL IMAGE COMPARING SYSTEM

[75] Inventors: Marco Corvi, Recco; Gianluca Nicchiotti, Rapallo; Riccardo Cecinati, Albissola Superiore, all of Italy

[73] Assignee: Finmeccanica, S.p.A., Italy

[21] Appl. No.: 08/728,310

[22] Filed: Oct. 9, 1996

[30] Foreign Application Priority Data

Oct. 10, 1995 [IT] Italy .................. TO95A0810

[51] Int. Cl.$^6$ .............. G06K 9/36; G06K 9/62; G06K 9/68; H04N 7/12
[52] U.S. Cl. ............. 382/278; 382/209; 382/218; 382/276; 348/408; 358/537
[58] Field of Search ................ 382/209, 218, 382/276, 278, 190; 348/398, 408; 358/537

[56] References Cited

U.S. PATENT DOCUMENTS

| | | | |
|---|---|---|---|
| 4,745,562 | 5/1988 | Prazdny | 702/71 |
| 4,906,940 | 3/1990 | Greene et al. | 382/190 |
| 5,051,585 | 9/1991 | Koshishiba et al. | 250/306 |
| 5,052,045 | 9/1991 | Perggrim et al. | 382/209 |
| 5,631,971 | 5/1997 | Sparrow | 382/209 |
| 5,659,363 | 8/1997 | Wilkinson | 348/398 |
| 5,680,150 | 10/1997 | Shimizu et al. | 358/537 |

FOREIGN PATENT DOCUMENTS 931191217  11/1993  European Pat. Off. ........ G06F 15/70

*Primary Examiner*—Bipin Shalwala
*Assistant Examiner*—Daniel G. Mariam
*Attorney, Agent, or Firm*—Palmatier, Sjoquist, Voigt & Christensen, P.A.

[57] ABSTRACT

A system for comparing digital images, whereby a first and second data processing block receive respective data streams corresponding to a reference image and a detected image for comparison with the reference image. The data processing blocks detect reference points in the images, and generate data, which is supplied to a block for determining a first approximation of the function $A_o$ relating the two images. The system also presents blocks for successively refining the function relating the reference image to the detected image. (FIG. 1)

23 Claims, 7 Drawing Sheets

5,907,641

1
DIGITAL IMAGE COMPARING SYSTEM

BACKGROUND OF THE INVENTION

The present invention relates to a digital image comparing system.

Digital image processing systems are known, which provide for comparing two similar images, e.g. two images of similar objects, or two images of the same scene recorded at different times.

More specifically, such systems provide for comparing a detected image with a reference image to determine any differences between the two, and are used for quality control, e.g. automatic surface control (of printed circuits, fabrics, etc.) and for controlling printing processes, e.g. in the case of paper currencies, for determining any difference between a test and reference bank note, and rejecting the test note when the differences detected exceed a given threshold value.

The above systems are also used as part of automatic cartography systems, for grouping different images (e.g. satellite-recorded images of the earth's surface) by superimposing common portions of adjacent images, or for comparing images of the same scene recorded at different times.

The image processing method normally employed by known systems of the above type comprises three main steps: a first step in which reference points are selected in a first image; a second step in which reference points corresponding to those selected in the first image are selected in a second image; and a third step in which the parameters of the transformation function relating corresponding reference points in the two images are calculated, e.g. by means of a least mean square algorithm.

The reference points may be selected manually or semi-automatically. In the first case, the operator selects the reference points in the first image manually, and the selection made by the operator may be improved and refined with the aid of the computer. This method provides for selecting an extremely limited number of points.

In the second case, the image is searched for points defining reference marks or figures with given recognizable characteristics, e.g. intersecting lines, widely curving contour lines, centers of enclosed regions, figure angles, etc. The drawback of this type of selection, however, is the highly complex computing and processing work involved, and the large number of numeric operations required to calculate the function relating the corresponding reference figures or reference marks in the two images.

SUMMARY OF THE INVENTION

It is an object of the present invention to provide a digital image processing system enabling straightforward, effective comparison of two digital images.

According to the present invention, there is provided a digital image comparing system, as claimed in claim 1.

BRIEF DESCRIPTION OF THE DRAWINGS

A preferred, non-limiting embodiment of the present invention will be described by way of example with reference to the accompanying drawings, in which.

2

Figure 3A:
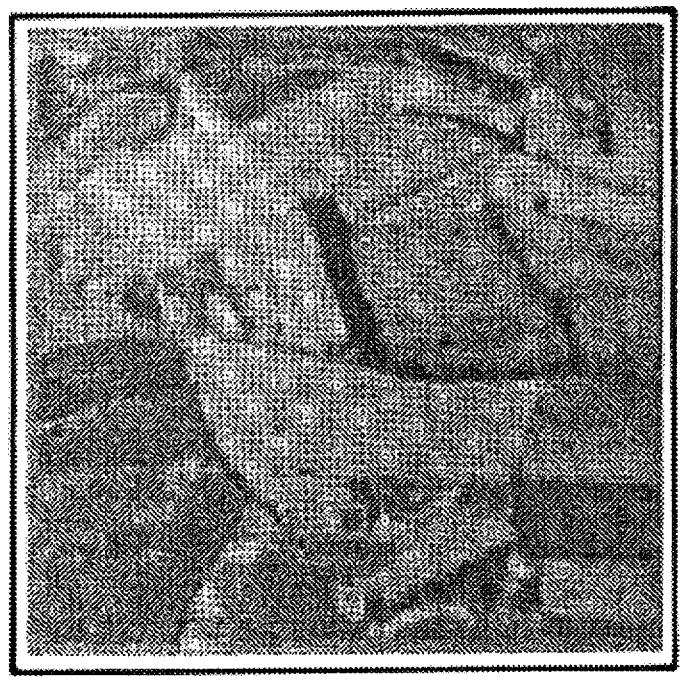
Figure 4A:
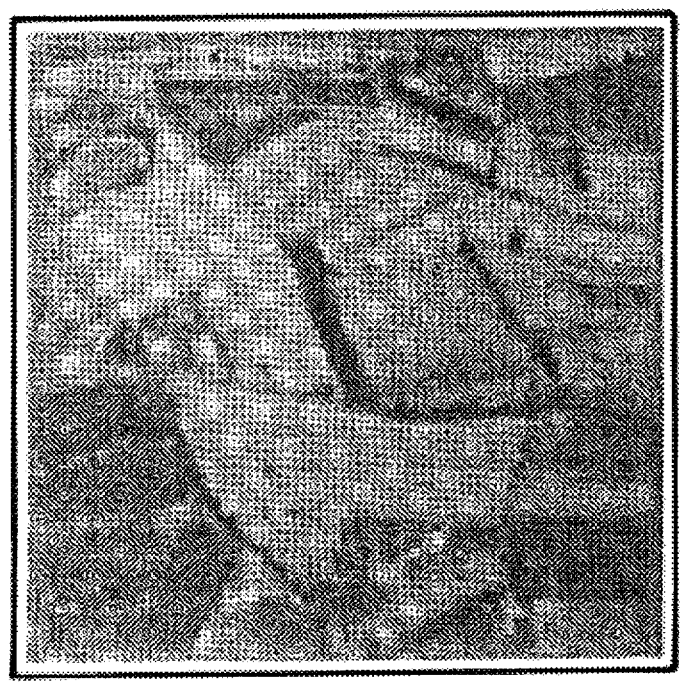
Figure 3B:
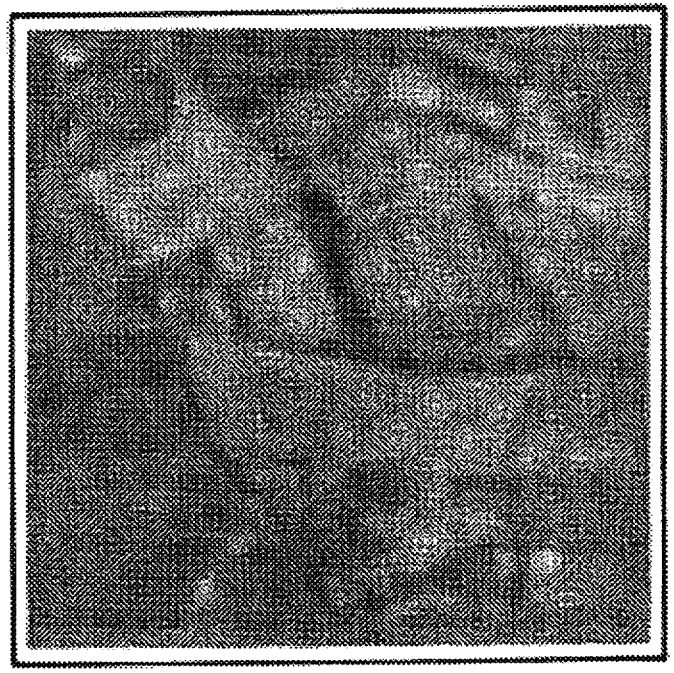
Figure 4B:
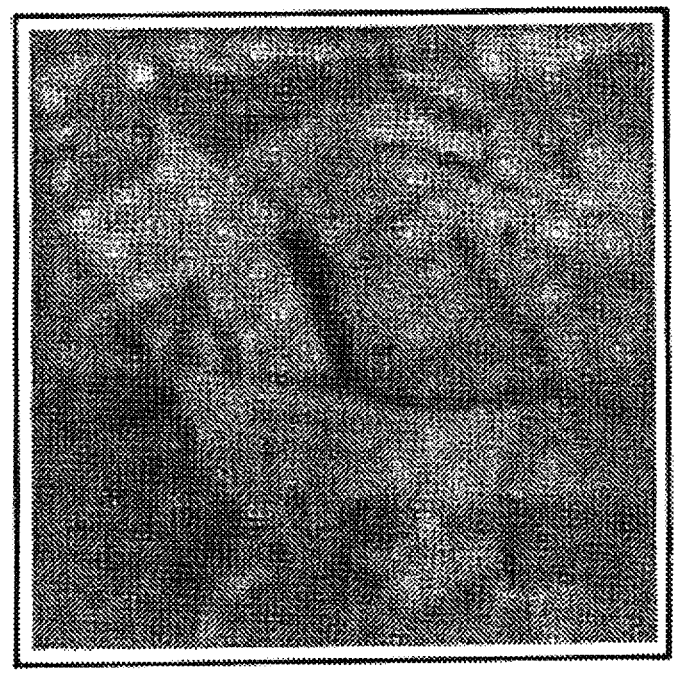
Figure 3C:
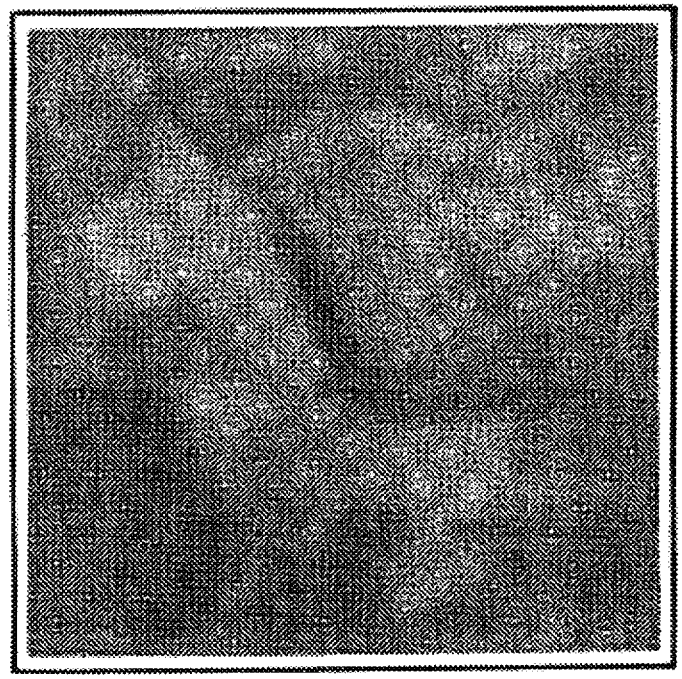
Figure 4C:
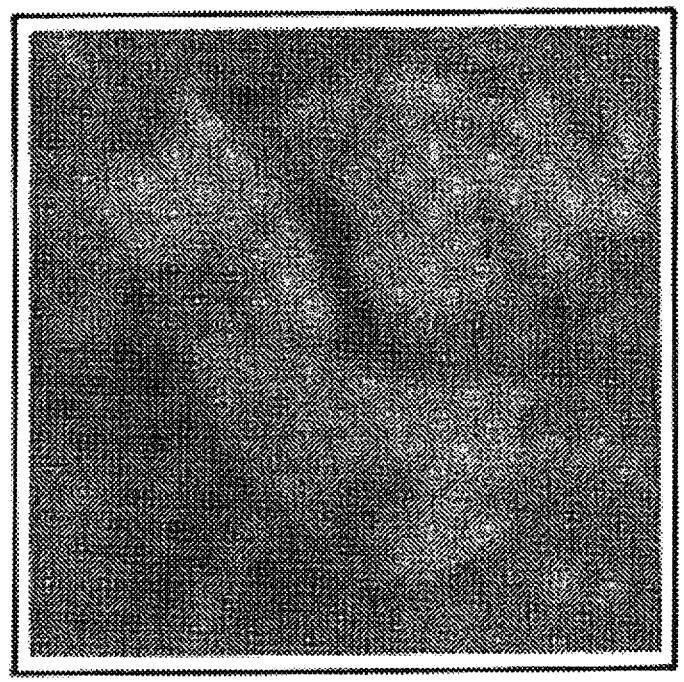
Figure 5:
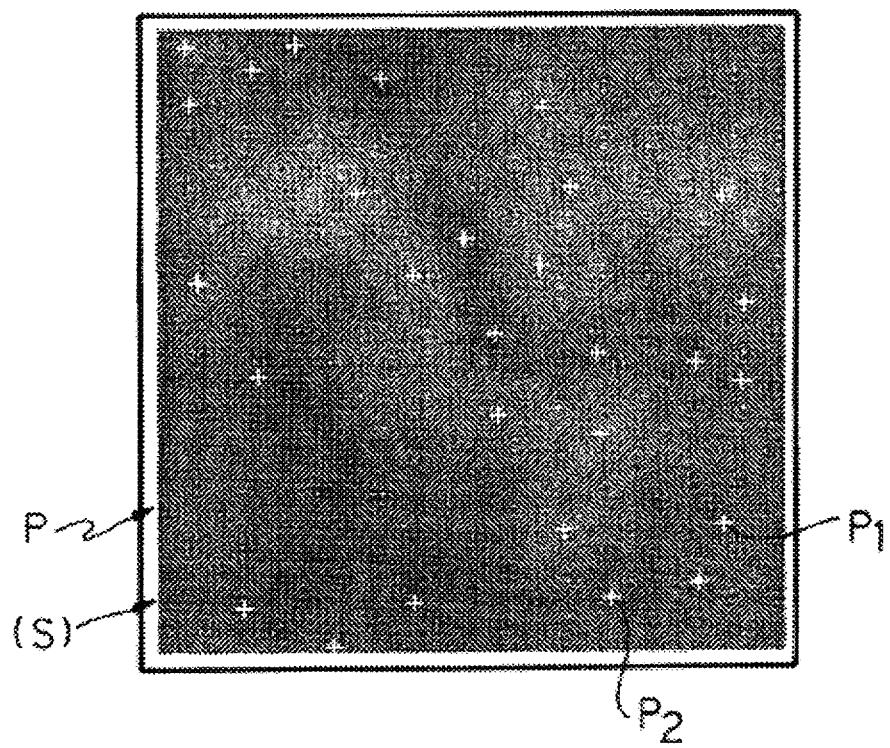
Figure 5:
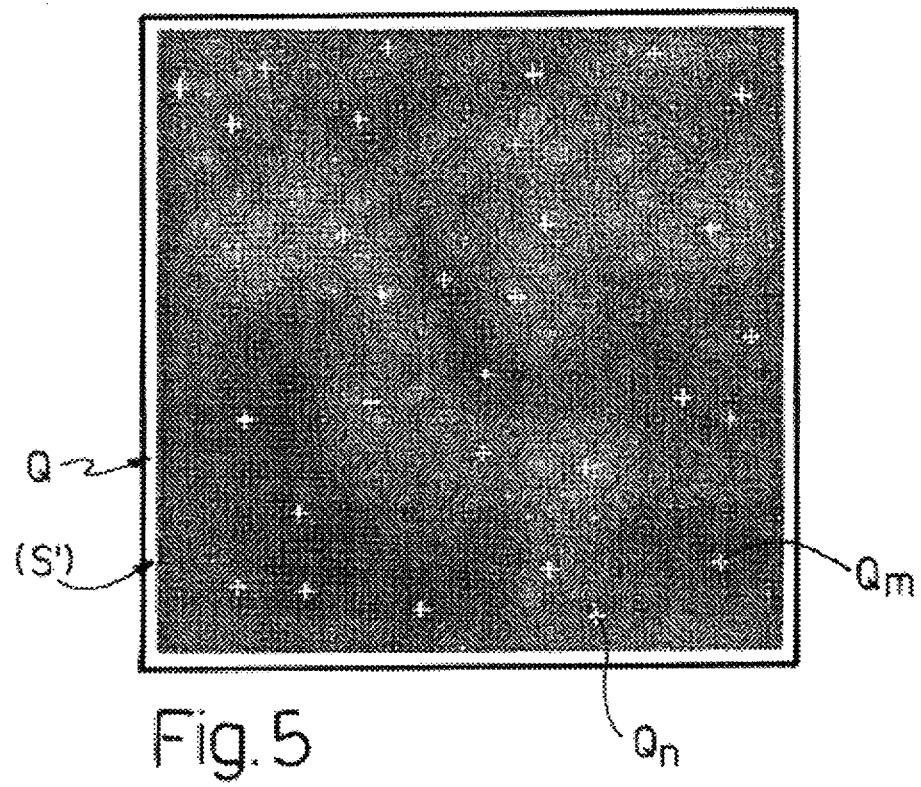
Figure 6:
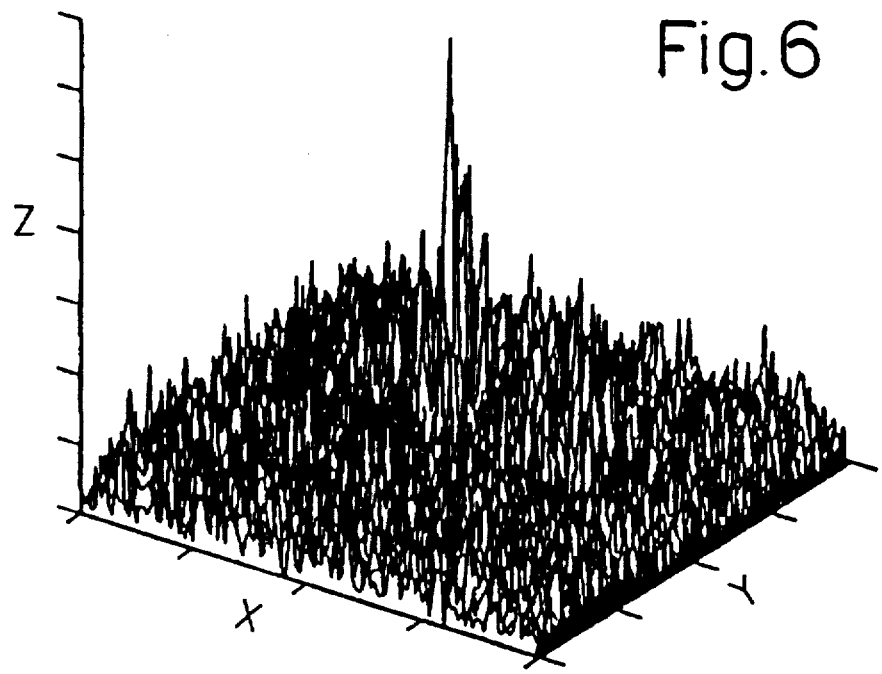
Figure 7:
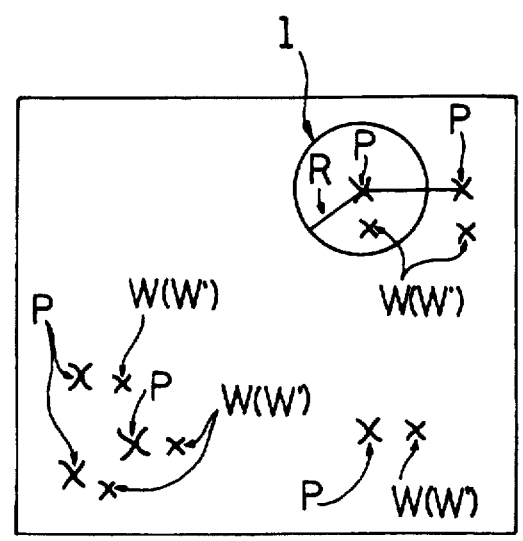

FIGS. 3a, 3b, 3c show images corresponding to sets of data processed successively by the system according to the present invention;

FIGS. 4a, 4b, 4c show images corresponding to sets of data processed successively by the system according to the present invention;

FIG. 5 shows a calculating step performed by the system according to the present invention;

FIGS. 6 and 7 show, graphically, calculating steps performed by the system according to the present invention.

DETAILED DESCRIPTION OF THE INVENTION

Figure 1:
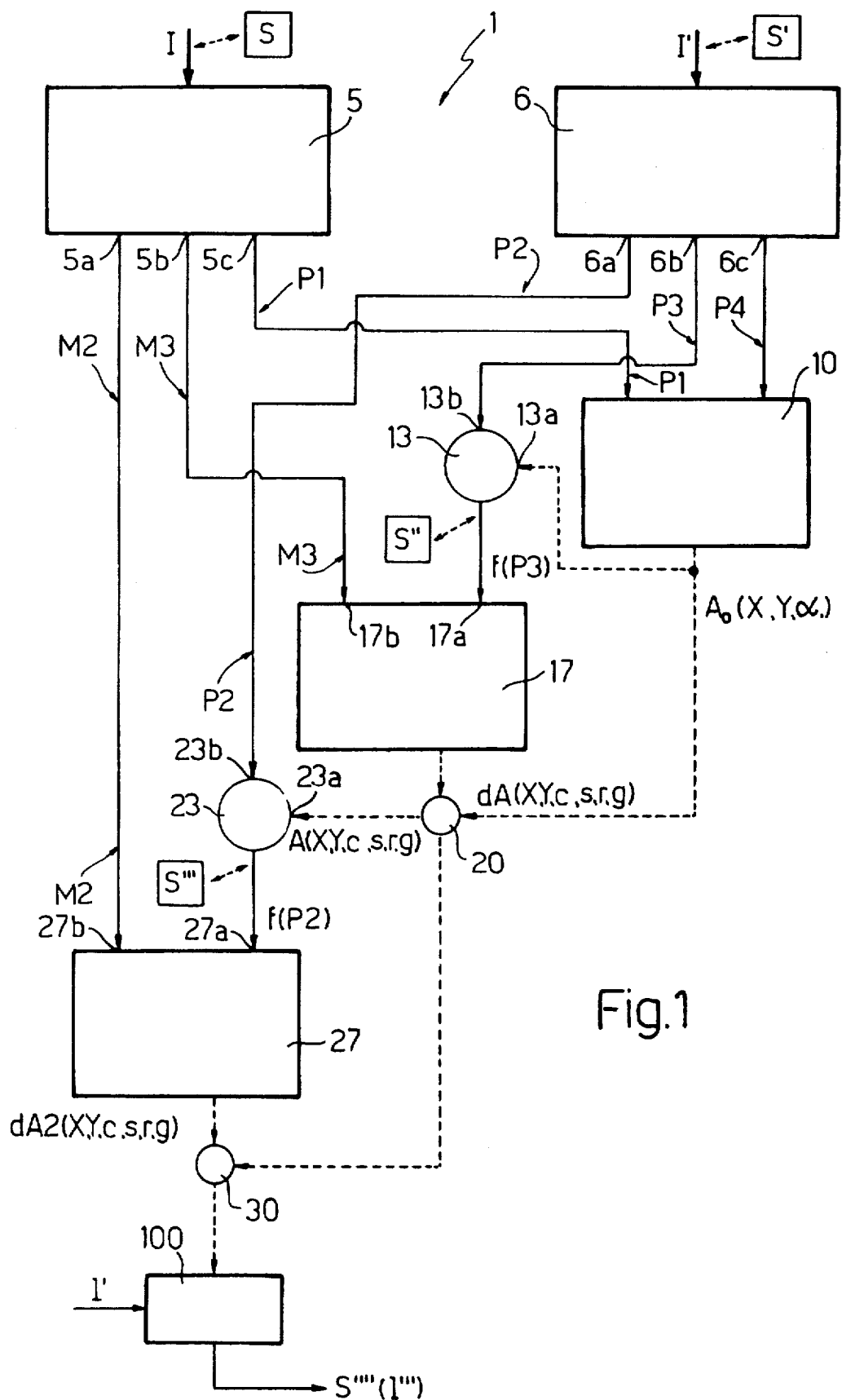
FIG. 1 shows a simplified block diagram of the architecture of a digital image comparing system in accordance with the teachings of the present invention.

Number 1 in FIG. 1 indicates a system for comparing digital images, and comprising a first and second data processing block 5, 6 supplied with respective data streams.

More specifically, block 5 is supplied with a first data stream I corresponding to a first (reference) image S; and block 6 is supplied with a second data stream I' corresponding to a second (detected) image S', in particular an image similar to and for comparison with image S.

Images S and S' are substantially similar, and may be:

a) images of the same subject (e.g. aerial photos of the same region) taken from different angles;

b) images of the same subject taken from the same angle but with different lighting (e.g. images recorded at different times);

c) images of the same subject taken by different devices (e.g. different cameras);

d) images of the same subject (e.g. bank notes) with small difference regions.

The information of images S and S' must be sufficiently structured to enable the selection of a number of reference points; and, with the exception of different lighting or small difference regions, it is assumed the relation linking the two images is approximately an affine transformation, and that no major deformation exists between images S and S'.

Data streams I and I' may comprise matrixes (e.g. square matrixes of size N×N) comprising a number of points (pixels), each with a grey level defined by a number (e.g. from 0 to 255 for an eight-bit representation).

As explained later on, block 5 processes the input data stream I, and presents three outputs 5a, 5b, 5c respectively presenting data M2, M3, P1 resulting from the processing of data stream I.

As explained later on, block 6 processes the input data stream I', and presents three outputs 6a, 6b, 6c respectively presenting data P2, P3, P4 resulting from the processing of data stream I'.

System 1 also comprises an initial estimating block 10, which is supplied with data P4 and P1 from respective second and first data processing blocks 6 and 5.

As explained later on, block 10 compares data P4 and P1 to obtain a first estimate of the set of parameters defining the function relating images S and S'.

More specifically, block 10 generates a three-dimensional vector $A_o(X, Y, alpha)$ defining the rotation-translation function approximately relating images S and S'. That is, three-dimensional vector $A_o(X, Y, alpha)$ defines a first approximation of to what extent image S' is translated (X,Y) and rotated about the center (alpha) in relation to reference image S.

Three-dimensional vector $A_o(X, Y, alpha)$ is supplied to a first input 13a of a compensating block 13, which also presents a second input 13b supplied with data P3 from data processing block 6.

By means of the function defined by three-dimensional vector $A_o(X, Y, alpha)$, compensating block 13 modifies data P3, and generates corrected data f(P3) defining an image S" correlated with, and including a first correction of, image S'. More specifically, the correction made to data P3 provides for compensating the rotation-translation of image S' as determined in block 10.

The output of compensating block 13 is connected to a first input 17a of a refining block 17, which also presents a second input 17b supplied with data M3 from data processing block 5.

As explained later on, block 17 compares data M3 and corrected data f(P3) to obtain parameters by which to perfect the definition of the function relating images S and S' and defined approximately by vector $A_o(X, Y, alpha)$.

In other words, the set of parameters generated by block 17 defines to what extent image S" still differs from reference image S.

Block 17 generates a six-dimension vector dA(X, Y, c, s, r, g) defining the affine function relating images S and S".

Vector dA(X, Y, c, s, r, g) is supplied to a block 20 by which it is combined, as explained later, with three-dimensional vector $A_o(X, Y, alpha)$ to generate a vector A(X, Y, c, s, r, g).

Vector A(X, Y, c, s, r, g) defines more accurately than vector $A_o(X, Y, alpha)$ the relationship between image S' and reference image S.

Vector A(X, Y, c, s, r, g) generated by block 20 is supplied to a first input 23a of a compensating block 23, which also presents a second input 23b supplied with data P2 from data processing block 6.

By means of the function defined by vector A(X, Y, c, s, r, g), compensating block 23 modifies data P2, and generates corrected data f(P2) defining an image S'" correlated with, and including a correction of, image S'. More specifically, the correction made to data P2 by block 23 is more precise than that made by block 13.

The output of compensating block 23 is connected to a first input 27a of a second refining block 27, which also presents a second input 27b supplied with data M2 from data processing block 5.

As explained later on, block 27 compares data M2 and corrected data f(P2) to obtain parameters by which to perfect the definition of the function relating images S and S' as compared with the definition made by vector A(X, Y, c, s, r, g).

In other words, the set of parameters generated by block 27 defines to what extent image S'" still differs from reference image S.

Block 27 generates a six-dimension vector dA2(X, Y, c, s, r, g) defining the affine function more closely relating images S and S'".

Vector dA2(X, Y, c, s, r, g) is supplied to a block 30 by which it is combined, as explained later, with vector A(X, Y, c, s, r, g) to generate a vector A2(X, Y, c, s, r, g) Vector Vector A2(X, Y, c, s, r, g) generated by block 30 is used to correct data stream I'.

Digital image comparing system 1 according to the present invention will now be described in more detail with reference to FIG. 2.

First data processing block 5 comprises a first digital filter 40 presenting an input 40a supplied with data stream I, and an output 40b communicating with the input of a second digital filter 41; digital filter 41 presents a first output 41a communicating with the input of a third digital filter 42, and a second output 41b communicating with a circuit 43; the first output 41a of digital filter 41 presents the filtered (and possibly subsampled) input signal; and the second output 41b presents the remainder, i.e. the input signal of filter 41 minus the signal filtered by it, or the complementary frequency-filtered input signal.

Digital filter 42 presents a first output 42a communicating with the input of a circuit 44, and a second output 42b communicating with a circuit 45; the first output 42a of digital filter 42 presents the filtered (and possibly subsampled) input signal; and the second output 42b presents the remainder, i.e. the input signal of filter 42 minus the signal filtered by it, or the complementary frequency-filtered input signal.

Circuits 43, 44, 45 provide for detecting the reference points of the image, which, in the embodiment described, correspond to the maximum and minimum local brightness points of the image filtered from image S or of the residual image. That is, circuits 43, 44, 45 provide for determining which are the darkest and lightest regions (pixels) in the image filtered from image S.

To distinguish the maximum from the minimum points P, each point is assigned and characterized by a binary flag indicating whether it is a maximum or minimum point. For example, FLAG=1 first type of point (local maximum point), FLAG=0 second type of point (local minimum point).

The outputs of circuits 43, 45, 44 communicate respectively with outputs 5a, 5b, 5c of data processing block 5.

Filters 40, 41, 42 are low-pass filters and conveniently implemented by two-dimensional FIR (finite-impulse-response) filters.

Filters 40, 41, 42 successively filter data stream I so that outputs 5c, 5b, 5a respectively present the low-frequency, medium-frequency and high-frequency content of image S; and filters 40, 41, 42 provide for increasingly "defocusing" image S, as shown in FIGS. 3a, 3b, 3c, which show images corresponding to the output data of filters 40, 41, 42 respectively.

Second data processing block 6 comprises a first digital filter 50 (identical to filter 40) presenting an input 50a supplied with data stream I', and an output 50b communicating with the input of a second digital filter 51 (identical to filter 41); digital filter 51 presents a first output 51a communicating with the input of a third digital filter 52 (identical to filter 42), and a second output 51b communicating with a circuit 53; the first output 51a of digital filter 51 presents the filtered (and possibly subsampled) input signal; and the second output 51b presents the remainder, i.e. the input signal of filter 51 minus the signal filtered by it, or the complementary frequency-filtered input signal.

Digital filter 52 presents a first output 52a communicating with the input of a circuit 54, and a second output 52b communicating with a circuit 55; the first output 52a of digital filter 52 presents the filtered (and possibly subsampled) input signal; and the second output 52b presents the remainder, i.e. the input signal of filter 52 minus the signal filtered by it, or the complementary frequency-filtered input signal.

Circuits 53, 54, 55 provide for detecting the reference points, in particular the maximum and minimum local brightness points of the image filtered from image S' or of the residual image.

The outputs of circuits 53, 55, 54 communicate respectively with outputs 6a, 6b, 6c of data processing block 6.

Filters 50, 51, 52 successively filter data stream I' so that outputs 6c, 6b, 6a respectively present the low-frequency, medium-frequency and high-frequency content of image S'; and filters 50, 51, 52 provide for increasingly "defocusing" image S', as shown in FIGS. 4a, 4b, 4c, which show images corresponding to the output data of filters 50, 51, 52 respectively.

Block 10 comprises a circuit 58 supplied with the data from circuits 54 and 44, and presenting an output communicating with a circuit 59 for generating three-dimensional vector $A_o(X, Y, alpha)$.

Circuit 58 is supplied with the reference points, e.g. the local maximum and minimum points of the images filtered from images S and S' and detected by circuits 44 and 54.

Operation of circuit 58 will now be described with reference to FIG. 5.

As shown in FIG. 5, data P1 comprises a number of points P corresponding to the maximum and minimum local brightness regions of the low-frequency image filtered from image S; and data P4 comprises a number of points Q corresponding to the maximum and minimum local brightness regions of the low-frequency image filtered from image S'.

As a consequence of the relationship between images S and S', a corresponding relationship also exists between points P and Q; and block 10 determines the approximate relationship between images S and S' by determining a possible rotation-translation function relating points P to Q.

More specifically, an analysis is made of a first pair of points, indicated generically by P1,P2, which is compared with all the possible pairs of points Qm, Qn in image S'; and, for each pair of points Qm, Qn, the deformation and rotation-translation transformation function F resulting in points P1,P2 matching respectively with points Qm, Qn is calculated, i.e.

$$F[(P1,P2)] \rightarrow (Qm, Qn)$$

Transformation function F is characterized by a set of four parameters X, Y, alpha and delta.

Hereinafter, the deformation parameter delta is disregarded on the assumption that deformation between images S and S' is negligible.

The above operations are repeated for all the other possible pairs of points P, and circuit 58 calculates all the possible transformation functions resulting in a match between all the possible pairs of points P and Q.

Whenever a transformation function characterized by X, Y, alpha is detected, circuit 58 assigns the X, Y pair a complex-value "grade" $e^{-j alpha}$, which is added to any "grades" already assigned to the X, Y pair.

When all the possible combinations of X, Y pairs of points P,Q have been considered, each X, Y pair is assigned a complex number equal to the sum of the "grades" obtained for all the possible combinations of pairs of points P,Q.

Circuit 59 determines the X, Y pair obtaining the "grade" sum of maximum absolute value (FIG. 6).

Of this grade, the alpha phase representing rotation of the transformation function is also evaluated, so that all the rotation-translation parameters X, Y, alpha are determined.

Figure 2:
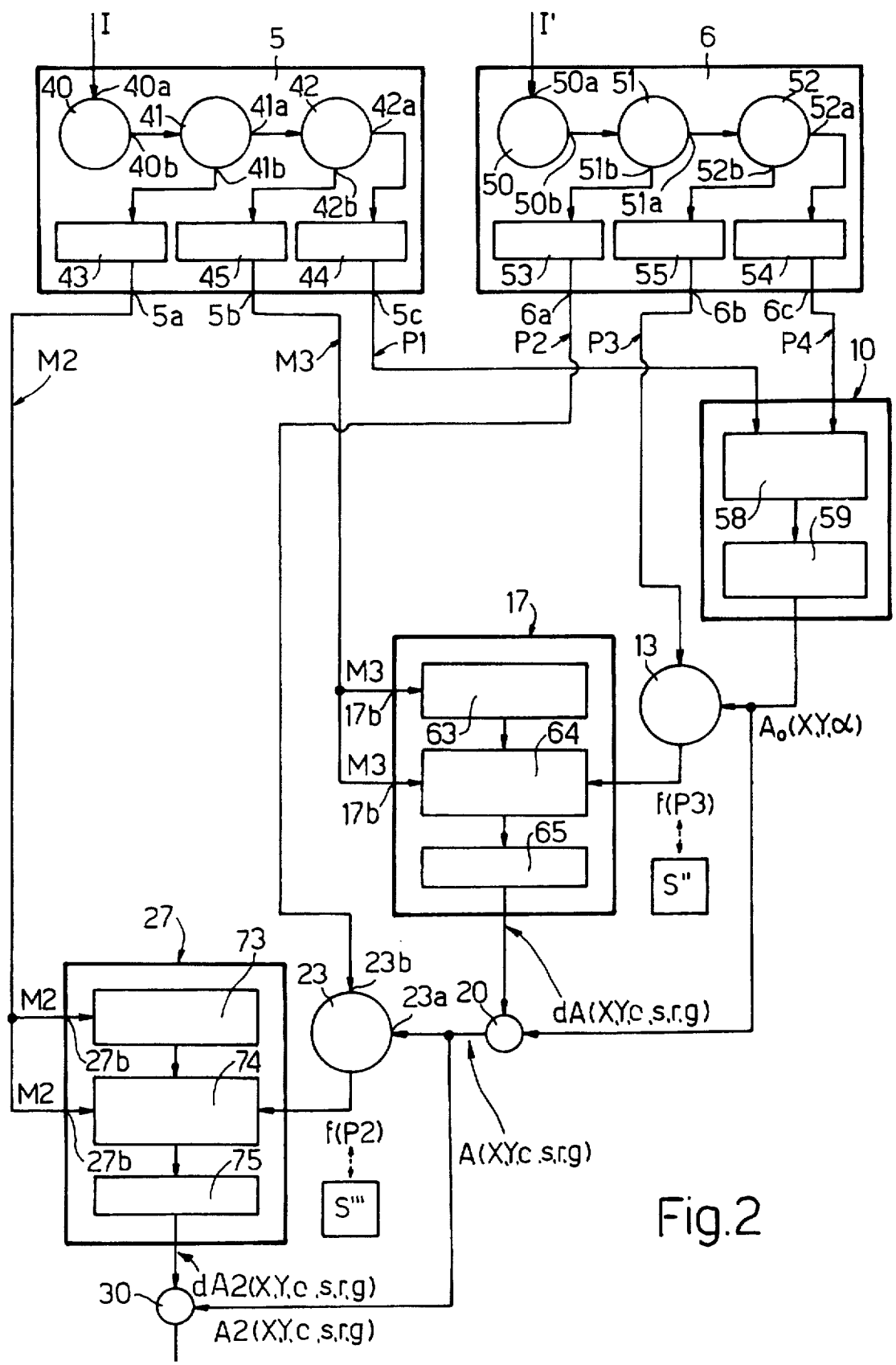
FIG. 2 shows a more detailed diagram of the operation of individual blocks in FIG. 1.

With reference to FIG. 2, block 17 comprises a first circuit 63, which receives data M3 supplied by the first data processing block and representing a number of points P (FIG. 7) corresponding to the local maximum and minimum (reference) points of the medium-frequency residual image of reference image S.

For each point P, circuit 63 calculates a neighborhood I defining a small portion of the image for further analysis.

The size of neighborhood I may be defined in various ways. For example, circuit 63 may calculate a circular neighborhood with a radius R equal to half the minimum distance between two points P1 and P2 of the same type (the type being defined by the binary value of the FLAG), or circular neighborhoods with a constant radius R.

In any case, the neighborhoods are calculated separately for minimum and maximum local brightness points P.

Circuit 63 cooperates with a circuit 64, which is also supplied with data M3 and corrected data f(P3) from block 13, so that it receives data corresponding to the points in image S" (transformed points W) to which the transformation function for compensating the transformation of images S and S' has been applied (via block 13).

Circuit 64 compares points P with points W to enhance the relationship between images S" and S'.

If the compensation made by block 13 is good, it is reasonable to assume points W come close to points P. More specifically, circuit 64 determines whether a point W falls within the neighborhood of a point P of the same type.

If it does, a matching relationship is established between point P and point W.

The function relating images S and S' is calculated by a circuit 65 cooperating with circuit 64. More specifically, circuit 65 uses the (known) least mean square algorithm, which determines the transformation function minimizing the sum of the squares of the distances between corresponding transformed points P and W. The L.M.S. algorithm of circuit 65 generates vector $dA(X, Y, c, s, r, g)$.

Block 27 presents a structure similar to that of block 17, and comprises a first circuit 73, which receives data M2 supplied by the first data processing block and representing a number of points P (FIG. 7) corresponding to the local maximum and minimum points of reference image S.

Like circuit 63 and separately for the maximum and minimum points, circuit 73 calculates a neighborhood I, e.g. a circular neighborhood with a radius R equal to half the distance between a point P and the closest point of the same type.

Circuit 73 cooperates with a circuit 74, which is also supplied with data M2 and corrected data f(P2) from block 23, so that it receives data corresponding to the points in image S'" (transformed points W') to which the transformation function for compensating the geometric relationship of images S and S' has been applied (via block 23).

Circuit 74 compares points P with points W' to enhance the relationship between images S'" and S.

If the compensation made by block 23 is good, it is reasonable to assume points W' come close to points P. More specifically, circuit 74 determines whether a point W' falls within the neighborhood of a point P of the same type.

If it does, a matching relationship is established between points P and W'.

The function relating points P and W' is calculated by a circuit 75 cooperating with circuit 74. More specifically, circuit 75 uses the least mean square algorithm, which determines the affine transformation function minimizing the sum of the squares of the distances between corresponding transformed points P and W'. Circuit 75 generates vector $dA2(X, Y, c, s, r, g)$.

In actual use, initial estimating block 10 is supplied with data P4 and P1 including the reference points P and Q of the images filtered from images S' and S.

As described previously, block 10 compares reference points P and Q, and generates three-dimensional vector $A_o(X, Y, alpha)$, which, by means of a rotation-translation function, defines a first approximation of the function relating images S and S'.

Three-dimensional vector $A_o(X, Y, alpha)$ is supplied to compensating block 13 by which it is used to correct data P3 and generate corrected data f(P3) corresponding to image S", which thus represents a first correction of detected image S' by system 1.

As described previously, block 17 compares data M3 (image S) and corrected data f(P3) to generate vector dA(X, Y, c, s, r, g), which, by means of a rotation-translation function, defines the affine function relating images S and S".

Vector dA(X, Y, c, s, r, g) is supplied to block 20 where it is combined with three-dimensional vector $A_o$(X, Y, alpha) to generate vector A(X, Y, c, s, r, g) defining a second approximation of the relationship between images S and S'.

The output of block 20 is supplied to block 23 following a series of iterative computing cycles in which vector dA(X, Y, c, s, r, g) is successively "refined" by successive calculations. System 1 in fact remains in the closed loop defined by block 17, block 20 and compensating block 13 for a predetermined number of operation cycles, or until the function defined by vector A(X, Y, c, s, r, g) reaches the desired degree of approximation.

Vector A(X, Y, c, s, r, g) is supplied to compensating block 23 by which it is used to correct data P2 and generate corrected data f(P2) corresponding to image S"', which thus represents a second correction of detected image S' by system 1.

As described previously, block 27 compares data M2 (image S) and corrected data f(P2) to generate vector dA2 (X, Y, c, s, r, g) defining the affine function relating images S and S"'.

Vector dA2(X, Y, c, s, r, g) is supplied to block 30 where it is combined with vector A(X, Y, c, s, r, g) to generate vector A2(X, Y, c, s, r, g) defining a third approximation of the relationship between images S and S'.

A description will now be given of the operations performed to combine vectors dA2 and A to obtain vector A2.

If A is vector (X, Y, c, s, r, g), and dA2 is vector (dX2, dY2, dc2, ds2, dr2, dg2), then vector A2 (X2, Y2, c2, s2, r2, g2) is given by the following equations:

$$X2=dX2+dc2X+ds2Y$$

$$Y2=dY2+dr2X+dg2Y$$

$$c2=dc2c+ds2r$$

$$s2=dc2s+ds2g$$

$$r2=dr2c+dg2r$$

$$g2=dr2s+dg2g$$

If vector A is the output vector of circuit 10, so that A=(X, Y, alpha), the previous formulas may be worked back to by A=(X, Y, alpha) being equivalent to a vector A=(X, Y, c, s, r, g), where c=cos(alpha), s=sin(alpha), g=cos(alpha) and r=-sin(alpha).

The output of block 30 is normally supplied following a series of iterative computing cycles in which vector A2(X, Y, c, s, r, g) is successively "refined" by successive calculations. System 1 in fact remains in the closed loop defined by block 27, block 30 and compensating block 23 for a predetermined number of operation cycles, or until the function defined by vector A2(X, Y, c, s, r, g) reaches the desired degree of approximation.

Vector A2(X, Y, c, s, r, g) is supplied to a compensating block 100, which corrects data stream I' by means of the function defined by vector A2(X, Y, c, s, r, g), and generates a data set I'" (FIG. 1) corresponding to an image S"" representing the registration of reference image S.

More specifically, the points in image S"" substantially match those in reference image S, which is therefore "covered" by image S"".

The system according to the present invention therefore clearly provides for eliminating the drawbacks of known systems by selecting the reference points in the image fully automatically and by means of relatively straightforward computing procedures, and by permitting the selection of a large number of points, normally at least a hundred, and at any rate more than those selectable manually. System 1 also provides for reducing processing time by the reference points being selected by circuits 43, 44, 45 and 53, 54, 55, as opposed to manually or by the recognition of predetermined figures in the image.

The equation relating the various images is subsequently calculated by successive approximations (blocks 10, 17 and 27) and using straightforward algorithms.

The system according to the present invention also provides for an extremely general image processing approach (the images in fact need not necessarily present recognizable figures) and may therefore be used for comparing a wide range of different images.

The algorithms used are extremely straightforward and "strong" in relation to noise, and provide for a fully automatic calculating procedure.

Clearly, changes may be made to the system as described and illustrated herein without, however, departing from the scope of the present invention.

For example, each data processing block 5, 6 may present a larger number of cascade-connected digital filters and a corresponding number of circuits for detecting the reference points of the filtered images. More generally, system 1 may present data processing blocks 5, 6 with N digital filters, N reference point detecting circuits, and N outputs, in which case, system 1 would present an initial estimating block (of the type defined by block 10) and N-1 refining blocks (like blocks 17 and 27).

We claim:

1. A system for comparing digital images, characterized by comprising:

first data processing block (5) receiving and elaborating a first data stream (I) corresponding to a first image (S), in particular a reference image;

second data processing block (6) receiving and elaborating a second data stream (I') corresponding to a second image (S'), in particular an image for comparison with the reference image;

said second image (S') being related to said first image (S) by an approximately affine function;

said first (5) and second (6) data processing blocks comprising first and second detecting blocks (43,44,45; 53,54,55) respectively receiving data from said first (I) and second (I') data stream;

said first and second detecting blocks (43,44,45; 53,54, 55) automatically detecting and selecting reference points (P,Q) on first image (S) and second image (S') having a predetermined characteristic by means of a computerized process;

said first and second detecting blocks (43,44,45; 53,54, 55) generating at least first (P1) and second (P4) data sets representing said reference points (P,Q);

said system (1) also comprising first data correlating block (10) receiving said first data set (P1) and said second data set (P4);

said first data correlating block (10) determining a first vector $A_o$(X,Y,alpha) defining a first approximation of the function relating corresponding reference points (P,Q) in said first (S) and said second (S') image, characterized by comprising first correcting block (13) receiving a third data set (P3), correlated with said second image (S'), and said first vector $A_o(X,Y,alpha)$;

said first correcting block (13) modifying said third data set (P3) by means of said first vector $A_o(X,Y,alpha)$, and generating a first corrected data set f (P3) representing a first corrected image (S");

said first correcting block (13) applying to said second image (S') a correction for compensating the function as determined (S') by said first processing block (10).

2. A system as claimed in claim 1, characterized in that said predetermined characteristic is at least a maximum local brightness or a minimum local brightness.

3. A system as claimed in claim 1, characterized by comprising second data correlating block (17) receiving fourth data sets (M3), correlated with said first image (S), and said first corrected data set f(P3);

said second data correlating block (17) generating a second vector dA(X,Y,c,s,r,g) defining the function relating reference points in said first corrected image (S") with the reference points in said first image (S).

4. A system as claimed in claim 3, characterized by comprising first combining block (20) receiving said first vector $A_o(X,Y,alpha)$ and said second vector dA(X,Y,c,s,r, g), and generating a third vector A(X,Y,c,s,r,g) defining, with a more accurate approximation than that defined by said first vector $A_o(X,Y,alpha)$, the function relating said first image (S) and said second image (S').

5. A system as claimed in claim 4, characterized by comprising second correcting block (23) receiving a fifth data set (P2), correlated with said second image (S'), and said third vector A(X,Y,c,s,r,g);

said second correcting block (23) modifying said fifth data set (P2), by means of said third vector A (X,Y,c, s,r,g), and generating a second corrected data set f(P2) representing a second corrected image (S'");

said second correcting block (23) applying to said second image (S') a correction for compensating the function as determined by said first and second data correlating blocks (10, 17).

6. A system as claimed in claim 5, characterized by comprising third data correlating block (27) receiving a sixth data set (M2), correlated with said first image (S), and said second corrected data set f (P2);

said third data correlating block (27) determining a fourth vector dA2(X,Y,c,s,r,g) defining the function relating reference points in said second corrected image (S'") with the reference points in said first image (S).

7. A system as claimed in claim 6, characterized by comprising second combining block (3) receiving said fourth vector dA2(X,Y,c,s,r,g) and said third vector A(X,Y, c,s,r,g), and generating a fifth vector A2(X,Y,c,s,r,g) defining, more accurately than the approximation defined by said third vector A(X,Y,c,s,r,g), the function relating said first image (S) and said second image (S').

8. A system as claimed in claim 1, characterized in that said first data processing block (5) comprises a number of digital filters (40, 41, 42), at least a first (40) of which receives said first data stream (I);

said digital filters (40, 41, 42) being arranged in series with one another, and presenting at least three outputs (92a, 42b, 41b) respectively presenting data relative to the low-frequency content of said first image (S), the medium-frequency content of said first image (S), and the high-frequency content of said first image (S).

9. A system as claimed in claim 8, characterized in that said first detecting block (43, 44, 45) comprises at least three detecting blocks (43, 44, 45) respectively receiving data relative to said high-frequency content, said low-frequency content, and said medium frequency content of said first image (S); said detecting blocks detecting the maximum and minimum local brightness points of said first image.

10. A system as claimed in claim 6, characterized in that said first data processing block (5) comprises:

a first digital filter (40) supplied at an input (40a) with said first data stream (I);

a second digital filter (41) input-connected to an output (40b) of said first digital filter (41);

a third digital filter (42) input-connected to a first output (41a) of said second digital filter (41);

said second digital filter (41) presenting a second output (41b) communicating with the input of a first detecting block (43);

said third digital filter (42) presenting a first output (42a) communicating with the input of a second detecting block (44), and a second output (42b) communicating with a third detecting block (45);

said first output (42a) of said third digital filter (42) presenting the filtered input signal, and said second output (42b) presenting a residual signal comprising the input signal of said third digital filter (42) minus the signal filtered thereby;

said first, second and third detecting blocks (43, 44, 45) detecting the maximum and/or minimum local brightness points of said first image (S).

11. A system as claimed in claim 10, characterized in that said second detecting block (44) generates said first data set (P1).

12. A system as claimed in claim 10, characterized in that said first (43) and third (45) detecting blocks respectively generate said sixth data set (M2) and said fourth data set (M3).

13. A system as claimed in claim 1, characterized in that said second data processing block (6) comprises a number of digital filters (50, 51, 52), at least a first (50) of which receives said second data stream (I');

said digital filters (50, 51, 52) being arranged in series with one another, and presenting at least three outputs (52a, 52b, 51b) respectively presenting data relative to the low-frequency content of said second image (S'), the medium-frequency content of said second image (S'), and the high-frequency content of said second image (S').

14. A system as claimed in claim 13, characterized in that said second detecting block (53, 54, 55) comprises at least three detecting blocks (53, 54, 55) respectively receiving data relative to said high-frequency content, said low-frequency content, and said medium-frequency content of said second image (S'); said detecting blocks detecting the maximum and/or minimum local brightness points of said second image (S').

15. A system as claimed in claim 5, characterized in that said second data processing block (6) comprises:

a first digital filter 95) supplied at an input (50a) with said second data stream (I');

a second digital filter (51) input-connected to an output (50b) of said first digital filter (50);

a third digital filter (52) input-connected to a first output (51a) of said second digital filter (51);

said second digital filter (51) presenting a second output (51b) communicating with the input of a first detecting block (53);

said third digital filter (52) presenting a first output (52a) communicating with the input of a second detecting block (54), and a second output (52b) communicating with a third detecting block (55);

said first output (52a) of said third digital filter (52) presenting the filtered input signal, and said second output (52b) of said third digital filter presenting a residual signal comprising the input signal of said third digital filter (52) minus the signal filtered thereby;

said first, second and third detecting blocks (53, 54, 55) detecting the maximum local brightness points of said second image (S').

16. A system as claimed in claim 15, characterized in that said second detecting block (54) generates said second data set (P4).

17. A system as claimed in claim 15, characterized in that said first (53) and third (55) detecting blocks respectively generate said fifth data set (P2) and said third data set (P3).

18. A system as claimed in claim 1, characterized in that said first data__correlating block (10) comprises a complex calculating block (58) receiving the reference points (P) of said first and second image (S, S');

said complex calculating block (58) analyzing all the possible pairs of reference points (Pn, Pm) in the first image (S), and calculating, for each pair of reference points (Pn, Pm) analyzed, all the linear transformations (F) resulting in the pair of points (Pn, Pm) analyzed in the first image matching with the possible pairs of reference points (Qm, Qn) in the second image;

said transformation (F) being characterized by four parameters (X, Y, alpha, delta) including two translation parameters (X, Y) and an angular rotation parameter (alpha);

said complex calculating block (58) assigning each pair of calculated translation parameters (X, Y) a complex-value grade ($e^{-j alpha}$) which is added to any grades already assigned to said pair of translation parameters (X, Y);

said first data correlating block (10) also comprising a selecting block (59) cooperating with said complex calculating block (58) and for determining the pair of translation parameters (X, Y) obtaining the grade total of maximum absolute value;

said selecting block (59) evaluating the phase (alpha) of said grade; said (alpha) representing the angular rotation of the transformation relating the first and second images (S, S').

19. A system as claimed in claim 3, characterized in that said second data correlated block (17) comprises a first delimiting block (63) receiving said fourth data set (M3) and for defining, for each reference point of the fourth data set (M3), a neighborhood of predetermined size:

said first delimiting block (63) also receiving a number of transformed reference points (W) corresponding to the reference points of said first corrected data set f(P3) representing the first corrected image (S");

said second data correlated block (17) also comprising first matching block (64) for determining whether a transformed reference point (W) falls within the neighborhood of a selected reference point (P);

said first matching block (64) calculating, for the selected points (P) and transformed points (W) for which a match has been detected, the function (dA(X,Y,c,s,r,g)) relating said points.

20. A system as claimed in claim 19, characterized in that said first matching means (64) generate said second vector dA(X, Y, c, s, r, g).

21. A system as claimed in claim 6, characterized in that said third data correlated block (27) comprise a second delimiting block (73) receiving said sixth data set (M2) and for selecting reference points (P) in said first image (S);

said second delimiting block (73) calculating, for each selected reference point (P) in the first image (S), a neighborhood of predetermined size;

said second delimiting block (73) also receiving a number of transformed reference points (W') corresponding to reference points of said second corrected data set f(P2) representing the second corrected image (S''');

said second data correlated block (17) also comprising second matching block (74) for determining whether a transformed point (W') falls within the circular neighborhood of a selected reference point (P);

said second matching block (74) calculating, for the selected points (P) and transformed points (W') for which a match has been detected, the function for a fourth vector (dA2(X,Y,c,s,r,g)) relating said points.

22. A system as claimed in claim 21, characterized in that said second matching block (74) generates said fourth vector dA2(X,Y,c,s,r,g).

23. A system as claimed in claim 10, characterized in that each digital filter (40, 41, 42) of said first data processing block (5) presents the same structure as a corresponding digital filter (50, 51, 52) of said second data processing block (6).

* * * * *

UNITED STATES PATENT AND TRADEMARK OFFICE
CERTIFICATE OF CORRECTION

PATENT NO. : 5,907,641
DATED : May 25, 1999
INVENTOR(S) : Marco Corvi, Gianluca Nicchiotti, Riccardo Cecinati It is certified that error appears in the above-identified patent and that said Letters Patent is hereby corrected as shown below:

col. 2, lines 35-40: please remove the indent and align the paragraph with the left-hand margin col. 3, line 57: please insert a period after the closing parenthesis (")")

col. 3, line 57: please delete the word "Vector"

col. 9, line 64: please delete "92a" and in its place insert --42a-- col. 11, line 20: please delete"_" and in its place insert a space col. 10, line 59: please delete "95" and in its place insert --50--

Signed and Sealed this

Twenty-fifth Day of July, 2000

Attest:

Q. TODD DICKINSON

Attesting Officer          Director of Patents and Trademarks